United States Patent
Valdes Ibarra

(10) Patent No.: US 10,954,037 B1
(45) Date of Patent: Mar. 23, 2021

(54) CONTAINER WITH INTERNALLY INCORPORATED HOOK ASSEMBLY

(71) Applicant: Antonio Valdes Ibarra, Miami, FL (US)

(72) Inventor: Antonio Valdes Ibarra, Miami, FL (US)

( * ) Notice: Subject to any disclaimer, the term of this patent is extended or adjusted under 35 U.S.C. 154(b) by 86 days.

(21) Appl. No.: 16/131,896

(22) Filed: Sep. 14, 2018

(51) Int. Cl.
*B65D 25/10* (2006.01)
*G01F 19/00* (2006.01)
*B65D 43/02* (2006.01)
*B65D 51/24* (2006.01)

(52) U.S. Cl.
CPC ......... *B65D 25/10* (2013.01); *B65D 43/0231* (2013.01); *B65D 51/246* (2013.01); *G01F 19/002* (2013.01)

(58) Field of Classification Search
CPC .... B65D 25/10; B65D 43/0231; B65D 1/246; B65D 77/245; G01F 19/002
USPC .......................... 220/735, 212; 206/541, 223
See application file for complete search history.

(56) References Cited

U.S. PATENT DOCUMENTS

| | | | |
|---|---|---|---|
| 5,706,974 A | 1/1998 | Murdick et al. | |
| 5,775,531 A | 7/1998 | Lowry | |
| D416,438 S | 11/1999 | Molo | |
| 6,604,645 B1 | 8/2003 | Vaupotic | |
| D483,988 S | 12/2003 | Kipperman et al. | |
| 7,168,461 B2 | 1/2007 | DeJonge | |
| 7,175,041 B2 | 2/2007 | Ekkert | |
| 7,464,475 B2 * | 12/2008 | Tsao | B65D 77/245 215/391 |
| 8,215,167 B2 | 7/2012 | Hall | |
| 8,313,001 B1 | 11/2012 | Reid et al. | |
| 8,567,629 B2 * | 10/2013 | VanDamme | B65D 51/246 220/212 |
| 8,651,311 B1 | 2/2014 | Drummond et al. | |
| 8,727,149 B1 | 5/2014 | Reid et al. | |
| 8,770,423 B2 | 7/2014 | McGeough | |
| 8,857,645 B2 | 10/2014 | Perry et al. | |
| 9,090,391 B2 | 7/2015 | Horton et al. | |
| 9,541,441 B2 | 1/2017 | Prero et al. | |
| 2002/0190112 A1 * | 12/2002 | Culeron | B65D 5/42 229/145 |
| 2005/0035122 A1 | 2/2005 | Ekkert | |
| 2013/0134057 A1 | 5/2013 | Thomas et al. | |
| 2018/0148225 A1 * | 5/2018 | Vandamme | B65D 33/2508 |
| 2019/0055073 A1 * | 2/2019 | Lee | B65D 51/246 |

* cited by examiner

*Primary Examiner* — James N Smalley
*Assistant Examiner* — Madison L Poos
(74) *Attorney, Agent, or Firm* — Albert Bordas, P.A.

(57) ABSTRACT

A container with an internally incorporated hook assembly, having a container assembly with an upper sidewall, and an upper interior face having a hook. A scoop has a handle that is removably secured onto the hook. The scoop extends into a cavity defined within the container assembly. The scoop is secured to the upper interior face by the hook to prevent the scoop from falling within or sinking into a granulated or powdered product in the container assembly.

10 Claims, 3 Drawing Sheets

CONTAINER WITH INTERNALLY INCORPORATED HOOK ASSEMBLY

BACKGROUND OF THE INVENTION

1. Field of the Invention

The present invention relates to containers, and more particularly, to containers having a hook assembly therein to secure a scoop.

2. Description of the Related Art

Applicant believes that one of the closest references corresponds to U.S. Pat. No. 5,706,974 issued to Murdick, et al. on Jan. 13, 1998 for Can for powder products having scoop retaining means. However, it differs from the present invention because Murdick, et al. teach a lid for a container designed to contain powder or granular materials that includes a lip on an interior or bottom surface of the lid for selectively attaching a scoop. The lip is resiliently deformable when an edge of the scoop is pressed against it. This deforming creates interference fit, thereby securing the scoop to the undersurface of the lid. When the scoop is to be used, it can be easily removed from the lid without the need for rooting and searching within the container for the lid.

Applicant believes that another reference corresponds to U.S. Pat. No. 5,775,531 issued to James W. Lowry on Jul. 7, 1998 for Container for powdered product having a measuring cup device. However, it differs from the present invention because Lowry teaches a container to be filled with a powdered product that includes a container body having an open bottom end and an end closure attached to the container top end portion for closing the container top end portion to adapt the container to be filled through the open bottom end portion with the container in an inverted position. The top end closure includes an easy-opening feature for adapting the container to be easily opened by removing at least a part of the top end closure to obtain access to the powdered product within the container after filling and closure of the bottom end portion. A measuring cup device is detachably attached at its closed side to an inside surface of the part of the top end closure adapted to be removed during container opening for adapting the cup device to be removed and detached for use after opening of the container and for adapting the container to be filled in the inverted position with an open side of the cup device facing up to receive powdered product therein during filling to prevent undesirable air from being trapped within the cup device.

Applicant believes that another reference corresponds to U.S. Pat. No. D416,438 issued to Nicholas J. Molo on Nov. 16, 1999 for Combined lid and scoop. However, it differs from the present invention because Molo teaches a different ornamental design for a combined lid and scoop.

Applicant believes that another reference corresponds to U.S. Pat. No. 6,604,645 issued to Vladimir Vaupotic on Aug. 12, 2003 for Container lid and implement. However, it differs from the present invention because Vaupotic teaches a lid for a container, which comprises a cover portion adapted to extend over the container, an implement adapted for use with contents of the container, and a hinge connecting the cover portion to the implement, wherein the implement is adapted to be rotated about the hinge into a storage position in which the implement lies against the cover portion. The cover portion may also be provided with an anti-tamper device or a tamper resistant or tamper proof arrangement.

Applicant believes that another reference corresponds to U.S. Pat. No. D483,988 issued to Kipperman, et al. on Dec. 23, 2003 for Combination closure and scoop. However, it differs from the present invention because Kipperman, et al. teach a different ornamental design of a closure and scoop combination.

Applicant believes that another reference corresponds to U.S. Pat. No. 7,168,461 issued to Stuart W. DeJonge on Jan. 30, 2007 for Combination spoon and cap for container. However, it differs from the present invention because DeJonge teaches a combination spoon-lid and a cap for a container that has a main container cap and a spoon-lid. The main container cap has a top and at least one sidewall and has a dispensing orifice located on the top. The cap also has a container attachment mechanism for removably attaching the cap to a container, and has a spoon-lid attachment mechanism on the top adapted to receive the spoon-lid and close the dispensing orifice. The spoon-lid has a first end with a dished spoon section and has a second end in the form of a handle, the spoon-lid adapted to removably connect to the attachment mechanism of the main cap to cover and seal dispensing orifice.

Applicant believes that another reference corresponds to U.S. Pat. No. 7,175,041 issued to Len Ekkert on Feb. 13, 2007 for Cap with attached utensil. However, it differs from the present invention because Ekkert teaches a cap/utensil combination having a cap, which has a cap top with an inner surface having at least a contact area thereof that is substantially smooth, and having at least one upwardly standing sidewall attached to the cap top, sidewall having an inner surface. The inner surface of the sidewall has a rib structure. A utensil has first and second points of contact with sections of the rib structure and at least partially along an axis of symmetry of the utensil and a third point of contact at least partially within a contact plane through the axis of symmetry, the contact plane being substantially perpendicular to a plane of the inner surface of the cap top. The three-points of contact ensure that the utensil is securely held within the cap, and yet is readily removable therefrom.

Applicant believes that another reference corresponds to U.S. Pat. No. 8,215,167 issued to Jacob Randy Hall on Jul. 10, 2012 for Scoop having a parking anchor for measuring and dispensing powdered or granular material. However, it differs from the present invention because Hall teaches a scoop for measuring and dispensing powdered or granular material that has at least one projection, such as, a fin, multiple intersecting fins, or a spike, which enable the scoop to be "parked" in the surface of a powdered or granular food product without the handle of the scoop coming in contact with the product. The projection is preferably molded unitary with the scoop and handle. Unless the container is vigorously shaken, dropped, or subjected to extreme accelerative or decelerative forces, the scoop will remain in its parked position until the container is reopened for a further dispensing of the powdered or granular food product. The scoop may be packaged as an assembly in combination with a discardable floating scoop retainer disk that is placed on the surface of the granular or powdered product, and prevents the scoop from sinking below the surface during shipping and handling.

Applicant believes that another reference corresponds to U.S. Pat. No. 8,313,001 issued to Reid, et al. on Nov. 20, 2012 for Container closure with stored scoop. However, it differs from the present invention because Reid, et al. teach a container with a granulated or powdered product that store a scoop in or on a threaded closure for the container, in such a way that the scoop will not sink down into the product.

Applicant believes that another reference corresponds to U.S. Pat. No. 8,770,423 issued to Peter Michael McGeough on Jul. 8, 2014 for Container closure with measuring spoon. However, it differs from the present invention because McGeough teaches a closure for a container that has an integral measuring spoon. A spout is adapted to fit over a mouth of a container and is induction heat sealed to the rim by a foil. The foil is torn by remove a removable strip that also provides a frame to support the spoon. One corner of the spout can be raised to provide a holder for the spoon after the closure has been opened.

Applicant believes that another reference corresponds to U.S. Pat. No. 8,727,149 issued to Reid, et al. on May 20, 2014 for Container with stored scoop. However, it differs from the present invention because Reid. et al. teach a container with a granulated, powdered or other loose product that stores a scoop within the container adjacent to a closure for the container, in such a way that the scoop will not sink down into the product. Several embodiments are disclosed, including different ways for retaining the scoop.

Applicant believes that another reference corresponds to U.S. Pat. No. 8,651,311 issued to Drummond, et al. on Feb. 18, 2014 for Measuring scoop and support for a container. However, it differs from the present invention because Drummond, et al. teach an insert for use with a container and for positioning in the container opening. The insert includes a body having an outer periphery dimensioned for receipt within container opening. A utensil is frangibly secured to the insert body within an internal open area. A receiving tab is provided that projects from the body into the open area. An engagement structure is formed on the utensil and on the receiving tab. The engagement portions cooperate with one another for removably securing the utensil to the receiving tab after the frangible connection to the body is removed.

Applicant believes that another reference corresponds to U.S. Pat. No. 8,857,645 issued to Perry, et al. on Oct. 14, 2014 for Container. However, it differs from the present invention because Perry, et al. teach a container for holding granular or powdered material and formed by a top wall, a bottom wall, a front wall, a rear wall, a first side wall, and a second side wall. A rotatable removable lid is interiorly mounted with a scoop and is pivotally hinged to a collar that includes a sealing gasket. The collar mounts to the walls of the container. A sealing wall of the lid cooperates with the gasket to prevent the contents from spilling. The container incorporates powder control features, a container wall junction preferred geometry and congruent scoop enabling convenient access to the contents, a tolerance variation accommodating and strength improving, J-shaped collar and interlocking indentations and flex clips, and a pressure controlling portion that prevents unwanted deformation due to pressure differentials.

Applicant believes that another reference corresponds to U.S. Pat. No. 9,090,391 issued to Horton, et al. on Jul. 28, 2015 for Container and closure. However, it differs from the present invention because Horton, et al. teach an improved container having a container body and a closure. A scooping utensil retainer is disposed on the closure. The scooping utensil retainer includes opposing flanges protruding from the closure surface. A flange rib protrudes from the first flange into the flange gap, extending from the closure surface to the distal end of the flange. A tapered retainer gap is provided between flanges for resiliently clamping the handle of a scooping utensil. The closure can include an annular ridge shaped for engaging a downwardly extending skirt on a like container when two like containers are vertically stacked. The container body includes an in-mold label affixed to a substantially straight side wall, the in-mold label covering at least about 95% of the exterior surface area of the container body.

Applicant believes that another reference corresponds to U.S. Pat. No. 9,541,441 issued to Prero, et al. on Jan. 10, 2017 for Integrated measuring scoop apparatus. However, it differs from the present invention because Prero, et al. teach an integrated measuring scoop apparatus that includes a mounting ring with at least a first mounting protrusion extending inwardly from an inner surface of the mounting ring, a measuring scoop having a bowl and an handle, and a recessed area in an exterior surface of the bowl and terminating in an upper support surface being arranged for engagement with the mounting protrusion and the handle being arranged for engagement with the mounting protrusion.

Applicant believes that another reference corresponds to U.S. Patent Application Publication No. 2005/0035122, published on Feb. 17, 2005 to Len Ekkert for Cap with attached utensil. However, it differs from the present invention because Ekkert teaches a cap/utensil combination having a cap that has a cap top with an inner surface having at least a contact area thereof that is substantially smooth, and having at least one upwardly standing sidewall attached to the cap top, sidewall having an inner surface. The inner surface of the sidewall has a rib structure. A utensil has first and second points of contact with sections of the rib structure and at least partially along an axis of symmetry of the utensil and a third point of contact at least partially within a contact plane through the axis of symmetry, the contact plane being substantially perpendicular to a plane of the inner surface of the cap top. The three-points of contact ensure that the utensil is securely held within the cap, and yet is readily removable therefrom.

Applicant believes that another reference corresponds to U.S. Patent Application Publication No. 2013/0134057 published on May 30, 2013 to Thomas C., et al. for Container and Closure. However, it differs from the present invention because Thomas C., et al. teach a container having a container body and a closure. A scooping utensil retainer is disposed on the closure. The scooping utensil retainer includes opposing flanges protruding from the closure surface. A flange rib protrudes from the first flange into the flange gap, extending from the closure surface to the distal end of the flange. A tapered retainer gap is provided between flanges for resiliently clamping the handle of a scooping utensil. The closure can include an annular ridge shaped for engaging a downwardly extending skirt on a like container when two like containers are vertically stacked. The container body includes an in-mold label affixed to a substantially straight sidewall, the in-mold label covering at least about 95% of the exterior surface area of the container body.

Other patents describing the closest subject matter provide for a number of more or less complicated features that fail to solve the problem in an efficient and economical way. None of these patents suggest the novel features of the present invention.

SUMMARY OF THE INVENTION

The present invention is a container with an internally incorporated hook assembly, comprising a container assembly comprising an upper sidewall, and an upper interior face having a hook. A scoop comprises a handle that is removably secured onto the hook. The scoop extends into a cavity defined within the container assembly.

The container assembly further comprises a top edge, a body sidewall, a bottom wall, and a neck. The upper interior face extends from the top edge to the neck. The container assembly further comprises a cap having a cap interior face that secures onto the upper sidewall, whereby the cap interior face contacts the top edge. The upper sidewall comprises a first predetermined diameter and the body sidewall comprises a second predetermined diameter, wherein the first predetermined diameter is smaller than the second predetermined diameter. The hook comprises first and second ends, and defines an angle of approximately 90°. The hook is positioned onto the upper interior face, whereby the first end is fixed to the upper interior face relatively close to the neck. The second end is aligned or separated a first predetermined distance from the top edge.

The handle comprises a handle hole, and first and second handle ends. The handle hole defines an inverted drop shape. The handle hole is positioned closer to the first handle end than the second handle end. The handle hole is a second predetermined distance from the first handle end. The first predetermined distance is smaller than the second predetermined to trap the scoop onto the hook when the cap is tightened onto the upper sidewall. In addition, the handle has a predetermined width and thickness, whereby the predetermined width and thickness are relatively larger than the first predetermined distance to trap the scoop onto the hook when the cap is tightened onto the upper sidewall.

The scoop further comprises a scoop edge, a scoop bottom wall, and a scoop sidewall. The first handle end is fixed to the scoop sidewall. The scoop bottom wall is separated a second predetermined distance from a body interior face of the body sidewall. The scoop has a predetermined length that is shorter than the first predetermined diameter. The container assembly houses a granulated or powdered product. The scoop is secured to the upper interior face by the hook to prevent the scoop from falling within or sinking into the granulated or powdered product in the container assembly.

It is therefore one of the main objects of the present invention to provide a container with an internally incorporated hook.

It is another object of this invention to provide a container with an internally incorporated hook to secure a scoop.

It is another object of this invention to provide a container with an internally incorporated hook to secure a scoop to prevent it from falling within or sinking into product contained in the container.

It is another object of this invention to provide a container with an internally incorporated hook that is volumetrically efficient for carrying, transporting, and storage.

It is another object of this invention to provide a container with an internally incorporated hook, which is of a durable and reliable construction.

It is yet another object of this invention to provide such a container with an internally incorporated hook that is inexpensive to manufacture.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
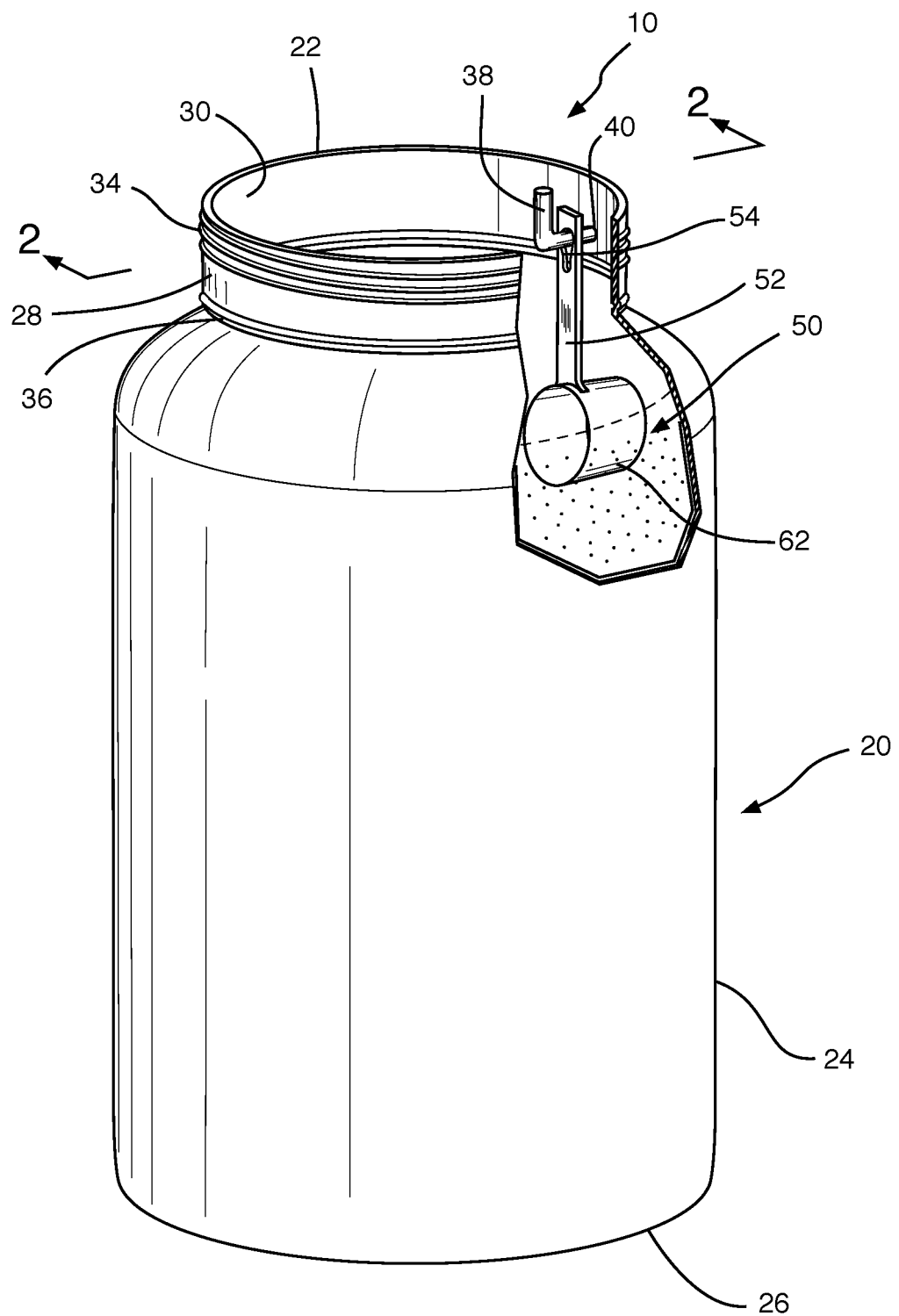
FIG. 1 is an isometric view of the present invention with a cutout at an upper sidewall and a body sidewall.

Referring now to the drawings, the present invention is a container with an internally incorporated hook assembly, and is generally referred to with numeral 10. It can be observed that it basically includes container assembly 20 and scoop 50.

As seen in FIG. 1, container assembly 20 comprises top edge 22, body sidewall 24, bottom wall 26, and upper sidewall 28. Upper sidewall 28 has upper interior face 30. Upper interior face 30 has hook 38 fixed thereto. Container assembly 20 further comprises neck 36. Upper interior face 30 extends from top edge 22 to neck 36. Upper sidewall 28 comprises a first predetermined diameter, and body sidewall 24 comprises a second predetermined diameter, wherein the first predetermined diameter is smaller than the second predetermined diameter.

Scoop 50 comprises handle 52 that is removably secured onto hook 38. Handle 52 comprises handle hole 54 to secure scoop 50 onto hook 38. In a preferred embodiment, handle hole 54 has an inverted drop shape.

Figure 2:
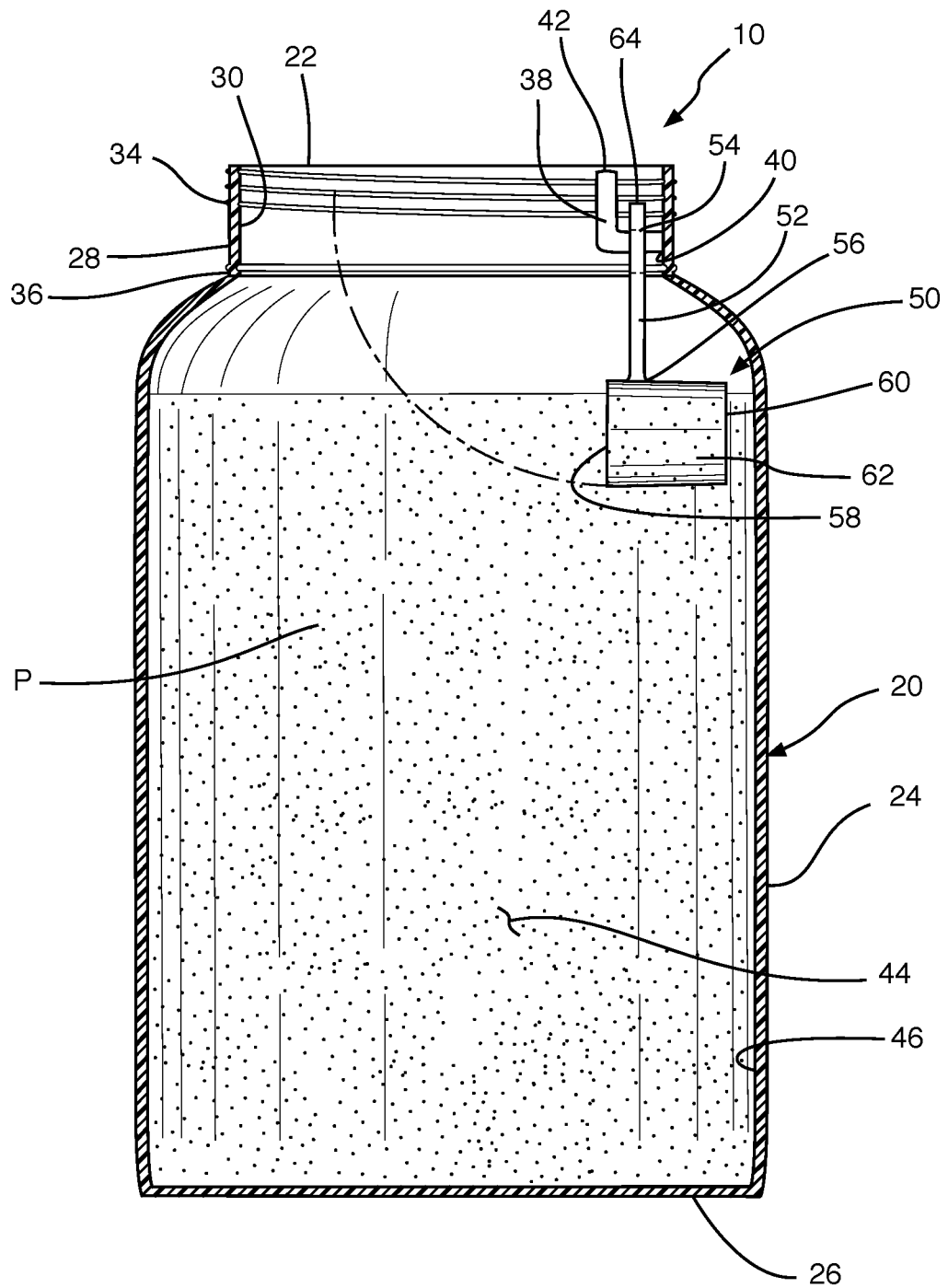
FIG. 2 is a cut view taken along the lines 2-2 as seen in FIG. 1.

As seen in FIG. 2, hook 38 comprises first end 40 and second end 42, and defines an angle of approximately 90°. Hook 38 is fixed onto upper interior face 30, whereby first end 40 is fixed to upper interior face 30 closer to neck 36 than top edge 22.

Scoop 50 secured onto hook 38 extends into cavity 44 defined within container assembly 20. Handle 52 further comprises first handle end 64 and second handle end 56. Scoop 50 further comprises scoop edge 58, scoop bottom wall 60, and scoop sidewall 62. Second handle end 56 is fixed to scoop sidewall 62. Scoop bottom wall 60 is separated a predetermined distance from body interior face 46. In a preferred embodiment, scoop 50 has a predetermined length that is shorter than the first predetermined diameter of upper sidewall 28.

Figure 3:
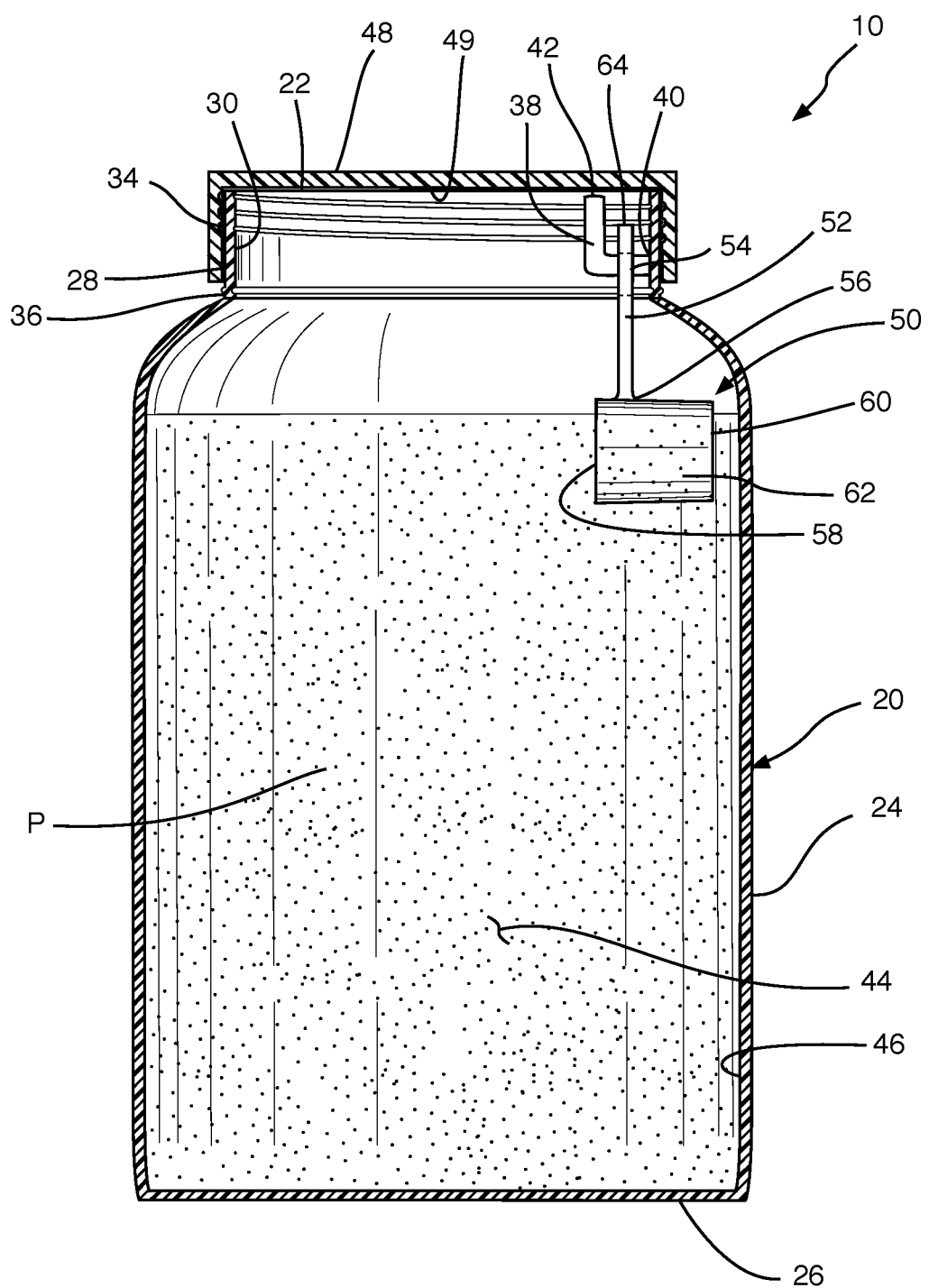
FIG. 3 is the cut view seen in FIG. 1 but with a cap secured onto the container assembly.

As seen in FIG. 3, container assembly 20 further comprises cap 48 having cap interior face 49 that secures onto upper sidewall 28, whereby in a preferred embodiment, cap interior face 49 contacts top edge 22. In a preferred embodiment, upper sidewall 28 comprises external threads 34 and cap 48 comprises internal threads, whereby the internal threads screw onto external threads 34 when cap 48 is tightened onto upper sidewall 28.

Handle hole 54 is positioned closer to first handle end 64 than second handle end 56. Second end 42 is aligned or separated a first predetermined distance from top edge 22, and handle hole 54 is positioned separated a second predetermined distance from first handle end 64, whereby the first predetermined distance is smaller than the second predetermined distance, to trap scoop 50 onto hook 38 when cap 48 is tightened onto upper sidewall 28. In addition, handle 52 has a predetermined width and thickness, whereby the predetermined width and thickness are relatively larger than the first predetermined distance to trap scoop 50 onto hook 38 when cap 48 is tightened onto upper sidewall 28.

Container assembly 20 houses a solid, granulated, and/or powdered product P. As an example, solid, granulated, and/or powdered product P is any powder such as a protein or whey protein power, food, vitamin, supplement, and/or medicine. Scoop 50 is secured onto upper interior face 30 by hook 38 to prevent scoop 50 from falling within or sinking into the solid, granulated, and/or powdered product P in container assembly 20.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A container with an internally incorporated hook assembly, comprising:
    A) a container assembly comprising an upper sidewall, a top edge, a body sidewall, a bottom wall, a neck, and an upper interior face having a hook, said hook having a substantially L-shape, said hook comprising first and second ends, and defines an angle of approximately 90°, said upper sidewall comprises a first predetermined diameter and said body sidewall comprises a second predetermined diameter, wherein said first predetermined diameter is smaller than said second predetermined diameter, said container assembly further comprises a cap having a cap interior face that secures onto said upper sidewall, whereby said cap interior face contacts said top edge, said second end is aligned or separated a first predetermined distance from said top edge; and
    B) a scoop comprising a handle that is removably secured onto said hook, said scoop extends into a cavity defined within said container assembly, said handle comprising a handle hole and first and second handle ends, said scoop having a predetermined length that is shorter than said first predetermined diameter, said handle hole is at a second predetermined distance from said first handle end, said first predetermined distance being smaller than said second predetermined distance to trap said scoop onto said hook when said cap is tightened onto said upper sidewall, said substantially L-shape, and said handle has a predetermined width and thickness, whereby said predetermined width and thickness are larger than said first predetermined distance to prevent said scoop from falling off said hook when said cap is tightened onto said upper sidewall.

2. The container with an internally incorporated hook assembly set forth in claim 1, further characterized in that said upper interior face extends from said top edge to said neck.

3. The container with an internally incorporated hook assembly set forth in claim 2, further characterized in that said hook is positioned onto said upper interior face, whereby said first end is fixed to said upper interior face relatively close to said neck.

4. The container with an internally incorporated hook assembly set forth in claim 1, further characterized in that said handle hole defines an inverted drop shape.

5. The container with an internally incorporated hook assembly set forth in claim 1, further characterized in that said handle hole is positioned closer to said first handle end than said second handle end.

6. The container with an internally incorporated hook assembly set forth in claim 1, further characterized in that said scoop further comprises a scoop edge, a scoop bottom wall, and a scoop sidewall.

7. The container with an internally incorporated hook assembly set forth in claim 6, further characterized in that said first handle end is fixed to said scoop sidewall.

8. The container with an internally incorporated hook assembly set forth in claim 6, further characterized in that said scoop bottom wall is separated a second predetermined distance from a body interior face of said body sidewall.

9. The container with an internally incorporated hook assembly set forth in claim 1, further characterized in that said container assembly houses a granulated or powdered product.

10. The container with an internally incorporated hook assembly set forth in claim 9, further characterized in that said scoop is secured to said upper interior face by said hook to prevent said scoop from falling within or sinking into said granulated or powdered product in said container assembly.

* * * * *